(12) United States Patent
Makino et al.

(10) Patent No.: US 6,779,989 B2
(45) Date of Patent: Aug. 24, 2004

(54) METHOD FOR CONNECTING COMPRESSOR WITH BUILT-IN ELECTRIC MOTOR AND EXTERNAL WIRING, CONNECTION DEVICE USED THEREFOR, AND COMPRESSOR WITH BUILT-IN ELECTRIC MOTOR USING THE SAME

(75) Inventors: Masahiko Makino, Shiga (JP); Yoshifumi Abe, Ritto (JP); Nobuyuki Nishii, Otsu (JP); Ken Obata, Tokyo (JP); Yoshihiko Konishi, Hikone (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/096,279

(22) Filed: Mar. 13, 2002

(65) Prior Publication Data

US 2002/0131869 A1 Sep. 19, 2002

(30) Foreign Application Priority Data

Mar. 14, 2001 (JP) ........................................ 2001-071749

(51) Int. Cl.⁷ ................................................. F04B 35/04
(52) U.S. Cl. ..................... 417/410.1; 417/422; 439/685
(58) Field of Search ............................. 417/410.1, 321, 417/422, 53; 439/685, 552; 174/52.1

(56) References Cited

U.S. PATENT DOCUMENTS

| | | | | |
|---|---|---|---|---|
| 3,566,341 A | * | 2/1971 | Skony | 439/685 |
| 3,777,302 A | * | 12/1973 | Travis | 439/854 |
| 3,892,911 A | * | 7/1975 | Codrino | 174/59 |
| 4,840,547 A | * | 6/1989 | Fry | 417/422 |
| 5,199,898 A | * | 4/1993 | Wisner | 439/685 |
| 6,290,528 B1 | * | 9/2001 | Moore et al. | 439/367 |
| 6,315,528 B1 | * | 11/2001 | Williams et al. | 417/410.5 |

* cited by examiner

Primary Examiner—Justin R. Yu
Assistant Examiner—Michael K. Gray
(74) Attorney, Agent, or Firm—Greenblum & Bernstein, P.L.C.

(57) ABSTRACT

A plurality of connection terminals are covered with a housing so that the plurality of connection terminals are collectively treated by handling of the housing. The housing is put over and fitted to a case of a compressor while connecting the connection terminals to connection pins for external wiring through an opening of the housing. With a seal member arranged in between, the opening is pressed against an external face of the case to conduct sealing between them.

25 Claims, 12 Drawing Sheets

METHOD FOR CONNECTING COMPRESSOR WITH BUILT-IN ELECTRIC MOTOR AND EXTERNAL WIRING, CONNECTION DEVICE USED THEREFOR, AND COMPRESSOR WITH BUILT-IN ELECTRIC MOTOR USING THE SAME

The present disclosure relates to subject matter contained in priority Japanese Patent Application No. 2001-71749, filed on Mar. 14, 2001.

BACKGROUND OF THE INVENTION

1. Field of the Invention

The present invention relates to a method for connecting a compressor having a built-in electric motor to an electric-power supply wiring that are suitable for mobile structures such as vehicles, a connection device used for the connection method, and a compressor with a built-in electric motor using the method and the connection device.

2. Description of Related Art

In a vehicle driven only by an engine, a compressor driven by the engine is used for air-conditioning the vehicle compartment, and the compressor is mounted alongside the engine.

An electric vehicle or a hybrid vehicle having both an engine and an electric motor and traveling by use of one of them according to conditions has been practically used for going on public roads. Between the two kinds of vehicles, most of those going on public roads are the hybrid vehicle, and air-conditioning of the compartments of such a vehicle is made by a refrigerating compressor driven by the engine in the same way as conventional engine-driven vehicles.

It is proposed for hybrid vehicles that the engines should be shut off while they are temporarily stationary at a place such as a traffic light. When the proposal is followed with a vehicle where a compressor driven by the engine is used, air-conditioning also stops each time when the vehicle stops, causing problem for the driver and passengers in the compartment in summer and winter seasons, and especially in regions with extremely cold or hot climate.

Consequently, an idea of using a compressor driven by an electric motor comes out. Compressors driven by electric motors include maintenance-free compressors integral with electric motors mass-produced and used for air-conditioning of houses, and it is desirable to use such compressors for electric vehicles.

The present inventors made various examinations and studies to find that compressors with built-in electric motors originally designed for air conditioning indoors have not very high sealing capability against water including rain water. This is because such compressors are stored within outdoor units and installed outdoors. In such compressors, an inside-outside connection terminal is arranged at the case that accommodates an electric motor and a compressing mechanism. A connection portion at the inside-outside connection terminal where connection is made between connection pins for external wiring and connection terminals of external wiring is covered by a cover made of synthetic resin, and the cover is screwed to the case. Sealing is made only at a portion where an opening edge of the cover and the case are tightly contacted with each other by the screwing. For improved sealing effect, an appropriate number of circular projections are arranged on a face of the opening edge of the cover that contacts with the case. However, this kind of sealing is considered insufficient for installing a compressor within an engine compartment of a vehicle that is prone to be subjected to water or oil.

Further, the connection terminal is, for example, a type called a fast-on terminal, which is a relatively small female type terminal having curl edge portions at both sides of a front face of a back plate. The connection terminal is connected by fitting to a connection pin for external connection having at its one side a plate, called a flag-type pin. Compressors with built-in electric motors have three, five or other number of the connection portions described above depending on the type of drive or control. Three connection portions are for connection to a 3-phase power supply, and five connection portions are for connection to 3-phase power supply and a sensor for detecting temperature of an electric motor.

Fitting the connection terminal to the connection pin for external wiring is made by pressing the plate of the connection pin into between the back plate and the end portions of the curl edge portions opposing the back plate, so that the connection pin for external wiring is pressed and set into narrow portions formed between the connection pins and the plate. In this constitution, the fitting is too tight to make the fitting manually while holding the connection pins for external wiring and the connection terminals by hands. Accordingly, the connection work requires tools for holding and handling the connection terminal to fit it to the connection pin for external wiring, and this is troublesome and time consuming work.

SUMMARY OF THE INVENTION

A main object of the present invention is to provide a connection method with which connection work of connection terminals including sealing is easily conducted with excellent workability, a connection device used for the connection method, and a compressor with a built-in electric motor using the connection method and the connection device. It is also an object of the invention to provide high sealing capability, required for vehicles, of the compressor integral with an electric motor.

In order to achieve the above objects, a method according to the invention for connecting a compressor having a built-in electric motor to external wiring is constituted as follows. A compressing mechanism and an electric motor that drives the compressing mechanism are accommodated in a case. Electric power to the electric motor is supplied through connection between a plurality of connection pins, projecting from an inside-outside connection terminal arranged at the case, provided for connection to external wiring, and connection terminals of external wiring. The plurality of connection terminals are covered with a housing in a waterproof state. The terminals are collectively treated by handling the housing, so that an opening of the housing is put over the inside-outside terminal and fixed to the case while connecting the plurality of connection terminals to the connection pins for external wiring through the opening of the housing. The opening is tightly contacted, directly or along with a seal member in between, to the case for conducting sealing between them.

A connection device for achieving the connection method described above is provided with a lead wire for connection to external wiring, a plurality of connection terminals that are connected to connection pins for external wiring and that are arranged at the tip of the lead wire. The device further including a housing that collectively protects the connection terminals and covers them with a waterproof portion of the housing (except its opening). The device also including a fixing device for fixing the housing to an outer face of the case, and a seal portion for creating a seal between the opening of the housing and the case.

In a compressor with a built-in electric motor according to the invention using the connection method and connection device described above, a compressing mechanism and an electric motor that drives the mechanism are accommodated in a case and used for air-conditioning a mobile structure compartment. Electric power for the motor is supplied from external wiring connected to a plurality of connection pins. The pins project from an inside-outside connection terminal arranged at the case and that provide a connection to the external wiring. The compressor according to the invention is further provided with a lead wire unit and a fixing device. The lead wire unit has a housing that collectively protects a plurality of connection terminals arranged at the tips of lead wires and is connected to the connection pins for external wiring. The housing covers the connection terminals in a waterproof manner, allowing connection of the connection terminals to the connection pins through an opening of the housing. The fixing device fixes the housing to an outer face of the case. The compressor also has a seal portion to seal the opening of the lead wire unit to the case.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Embodiments of a method for connecting a compressor having a built-in electric motor to a wiring for supplying electric power to the electric motor, a connection device used for the method, and a compressor with a built-in electric motor using the method and the device according to the invention will be described below referring to the drawings.

An embodiment of the invention described below is an example showing a case where sealing capability is secured for a compressor with a built-in electric motor to be mounted in an engine compartment of a vehicle such as an electric vehicle and hybrid vehicle. The invention is, however, not limited to this, and is also applicable to conventional compressors with built-in electric motors for air-conditioning indoors.

Figure 8:
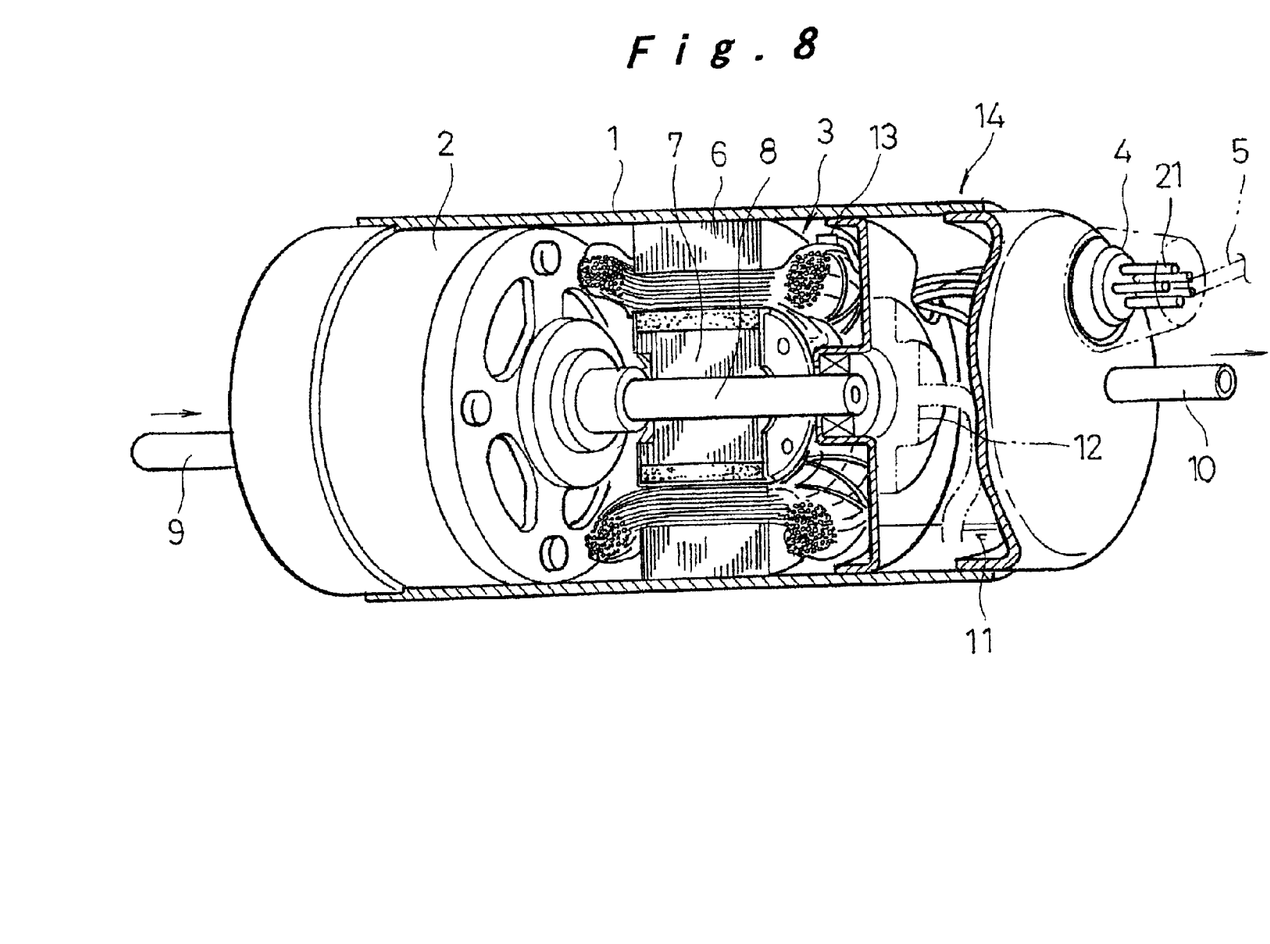
FIG. 8 is a perspective view illustrating the compressor with its inside mechanisms.

As shown in FIG. 8, a compressor 14 with a built-in electric motor according to the embodiment accommodates within a case 1 a compressing mechanism 2 and an electric motor 3 that drives the compressing mechanism 2. The electric motor 3 is driven by electric power supplied through external wiring 5 connected to an inside-outside connection terminal 4 on an outer face of the case 1. The electric motor 3 is, for example, a brushless motor having in combination a stationary armature 6 and a magnet rotor 7, and the compressing mechanism 2 is driven by a drive shaft 8 coupled to the magnet rotor 7. The compressing mechanism 2 intakes a refrigerant that returns from a refrigeration cycle through an intake pipe 9 arranged at the case 1 and compresses it, and then discharges the compressed refrigerant into the case 1. The refrigerant discharged into the case 1 cools the electric motor 3, and is discharged to the outside through a discharge pipe 10 arranged at the case 1, to be supplied to the refrigeration cycle. Oil 11 is stored at the bottom of the case 1, and taken in by a pump 12 co-driven by the drive shaft 8. The oil 11 is then fed with pressure through the drive shaft 8 to bearing portions of the drive shaft 8 and sliding parts of the compressing mechanism 2 to lubricate them. After the lubrication, the oil 11 seeps and flows out from respective sliding parts, and returns to the case 1. Because of its compatibility with the oil 11, a portion of the refrigerant discharged to the case 1 carries the oil 11 stored in the case 1 to lubricate sliding parts of portions where the oil 11 is not fed with pressure by the pump 12. Thus, the compressor 14 with the built-in electric motor 3 is durable for use for a long period without maintenance.

Figure 1:
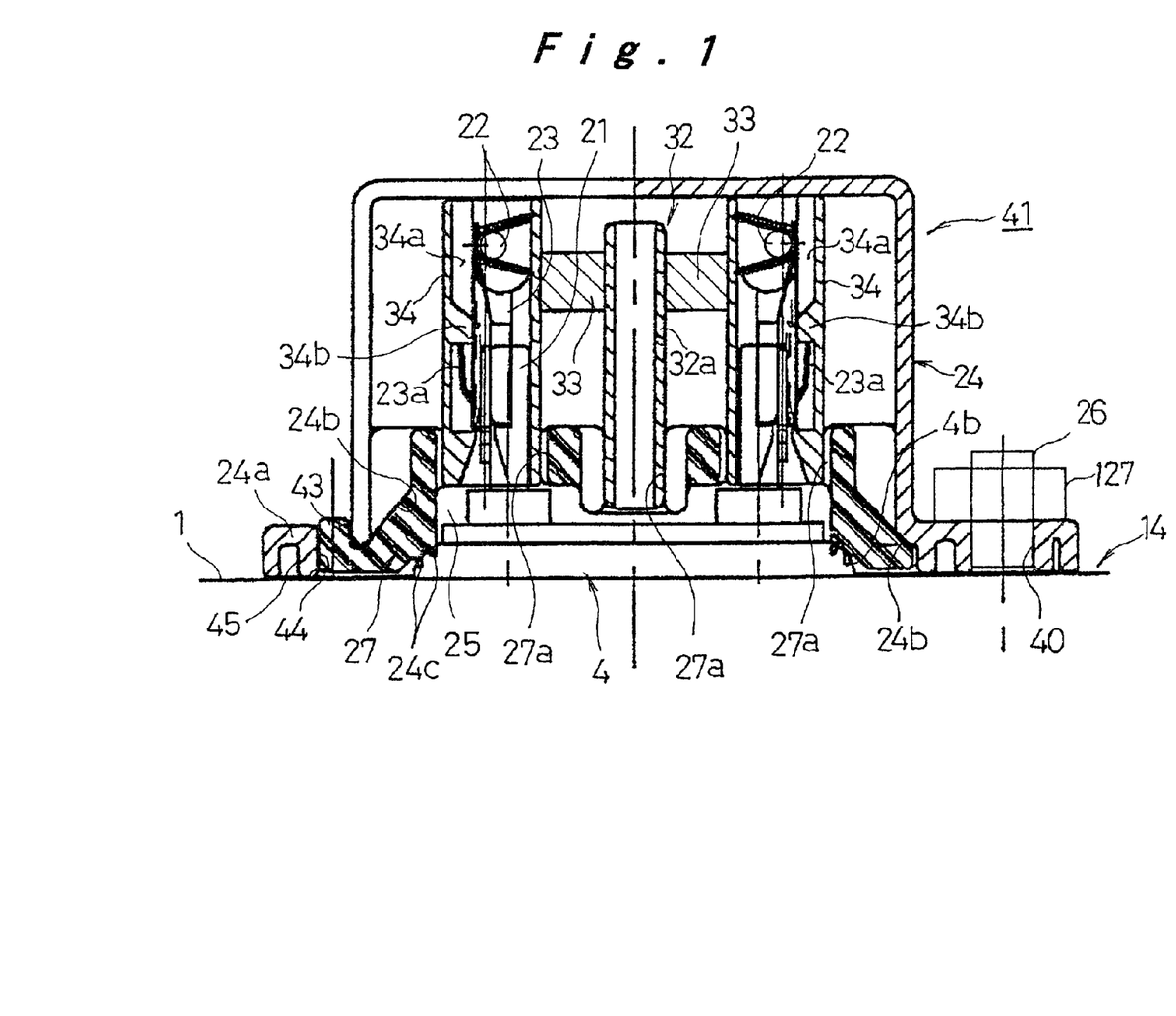
FIG. 1 is a cross-sectional view showing a connection portion according to a first embodiment of the invention, where an inside-outside connection terminal of a compressor having a built-in electric motor and external wiring are connected to each other.
Figure 2:
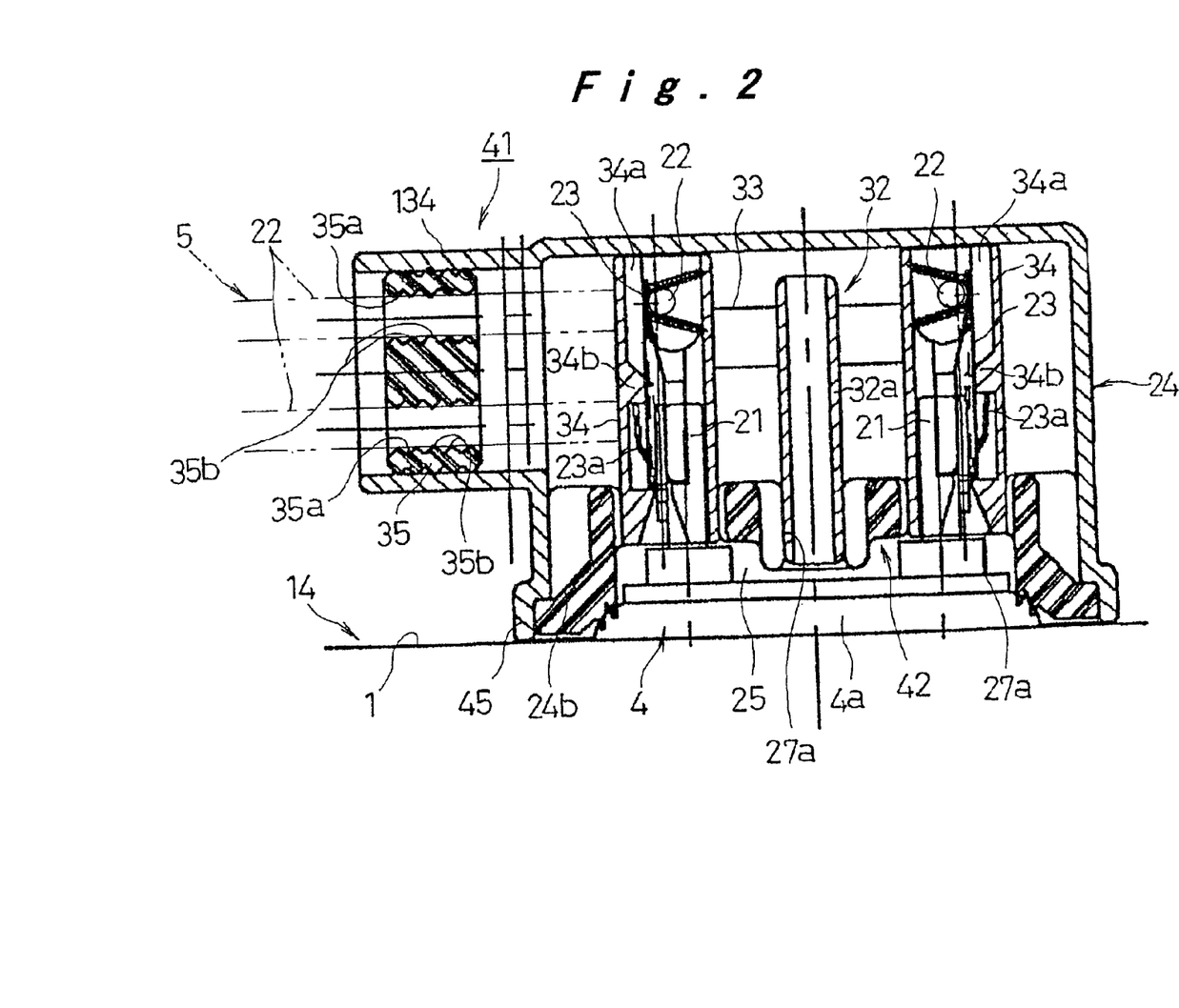
FIG. 2 is a cross-sectional view of the part of FIG. 1 seen from an angle different from that of FIG. 1.
Figure 9:
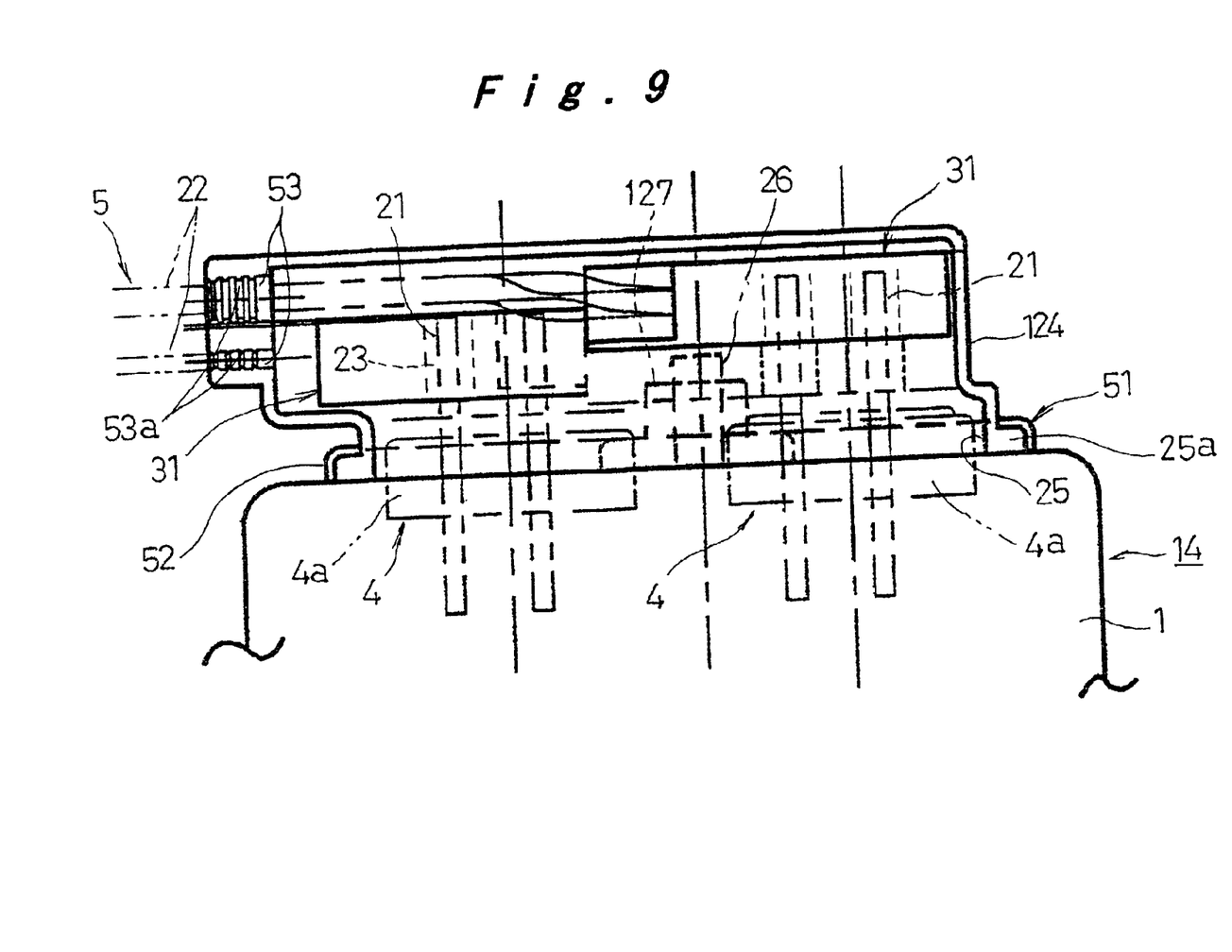
FIG. 9 is a side view illustrating a connection portion according to a second embodiment of the invention, where an inside-outside connection terminal of a compressor having a built-in electric motor and external wiring are connected to each other.

A first embodiment is shown in FIGS. 1 to 8, and a second embodiment is shown in FIGS. 9 to 14. Both embodiments will be explained below referring to these figures. When connecting a plurality of connection terminals 23 having lead wires 22, composing a part of the external wiring 5, to a plurality of connection pins 21 for external wiring which project from the inside-outside connection terminal 4, the connection terminals 23 are covered in a waterproof manner by a housing 24 excluding an opening 25 of the housing 24. As such, the plurality of connection terminals 23 are collectively protected by the housing 24. The housing 24 is positioned over the inside-outside connection terminal 4 while connecting the plurality of connection terminals 23 to the connection pins 21 for external wiring through the opening 25. The housing is then fixed to the case 1 by screws 26 or other means. The opening 25 of the housing 24 is, at the same time, tightly contacted, directly as the second embodiment of FIG. 9 shows or along with a seal member 27 as the first embodiment of FIGS. 1 and 2 show, to an outer face of the case 1 and/or an outer face of the inside-outside connection terminal 4, thereby sealing the housing 24 to the case 1. The screws 26 are, as shown in FIGS. 1 and 9, fixed to the case 1 by welding or other means, and flanged nuts 127 are engaged on them for fastening. However, the invention is not limited to those described above.

Figure 3:
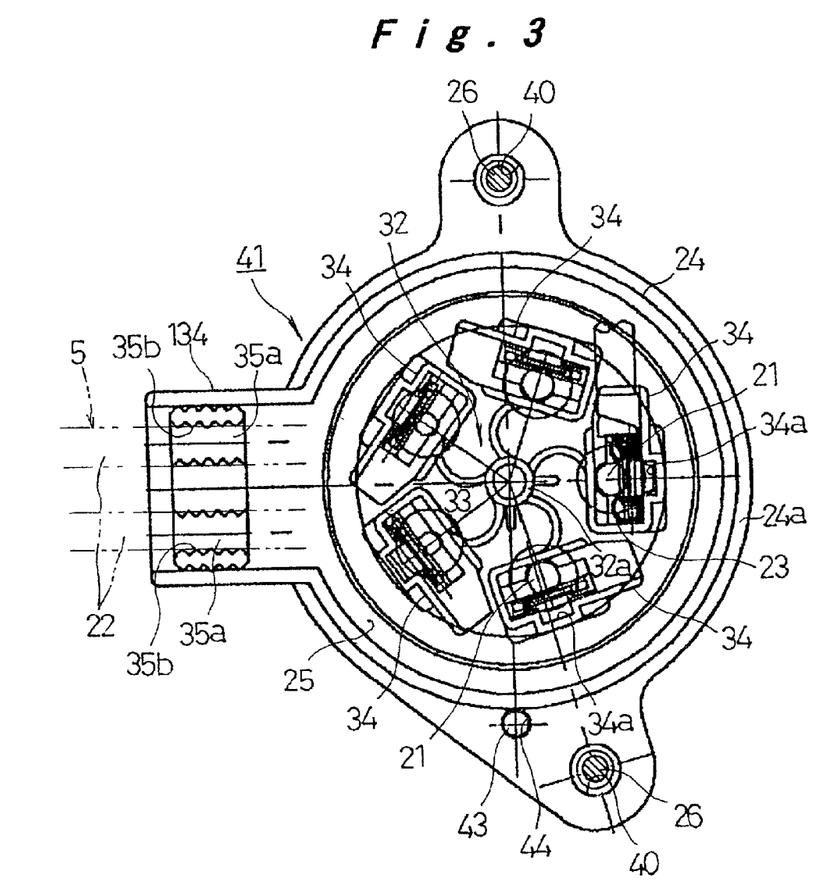
FIG. 3 is a transverse cross-sectional view of the part in FIG. 1.
Figure 4:
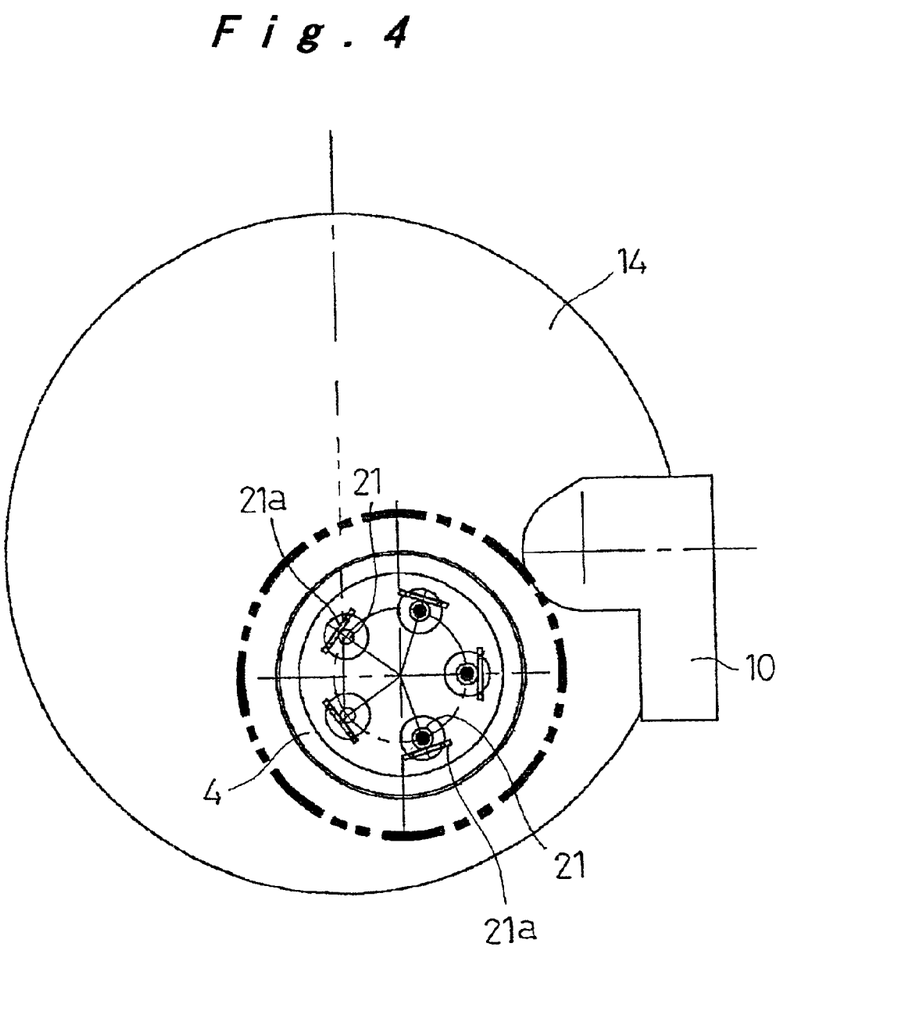
FIG. 4 is a front view of an end face having the inside-outside connection portion of the compressor.
Figure 5:
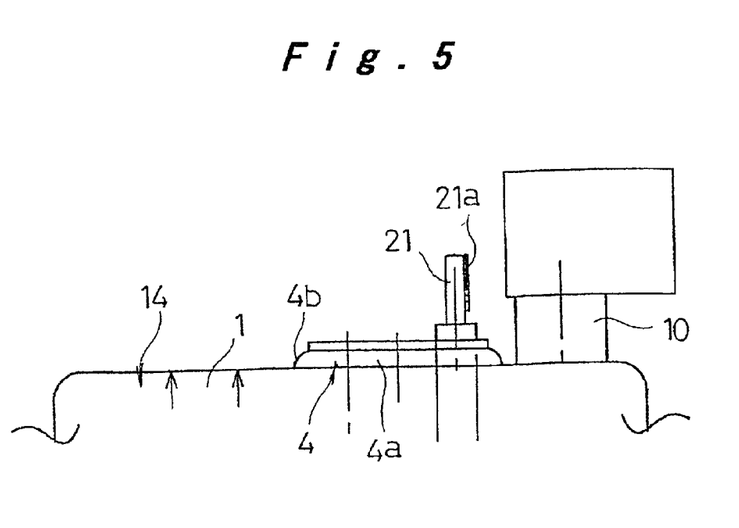
FIG. 5 is a side view of the end face of FIG. 4.
Figure 6:
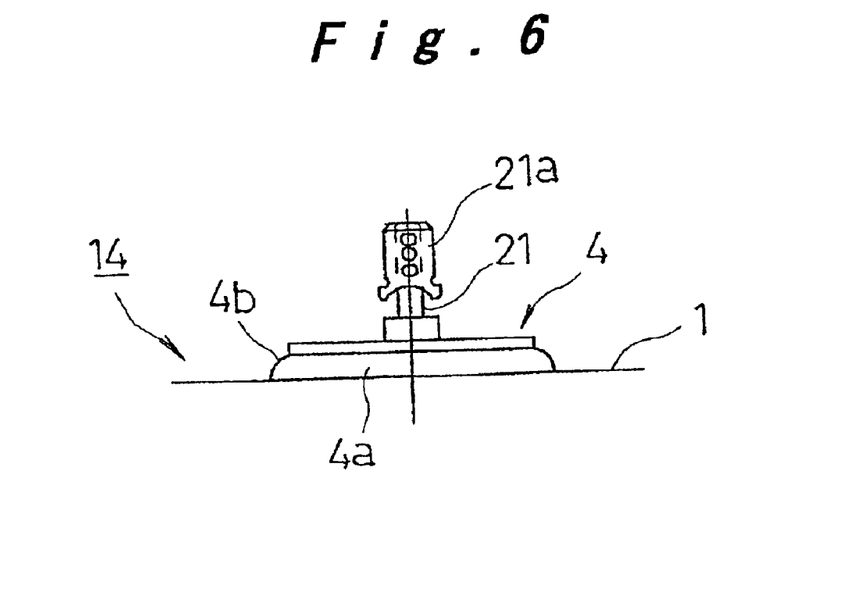
FIG. 6 is a side view of the end face of FIG. 4 seen from an angle different from that of FIG. 5.
Figure 7:
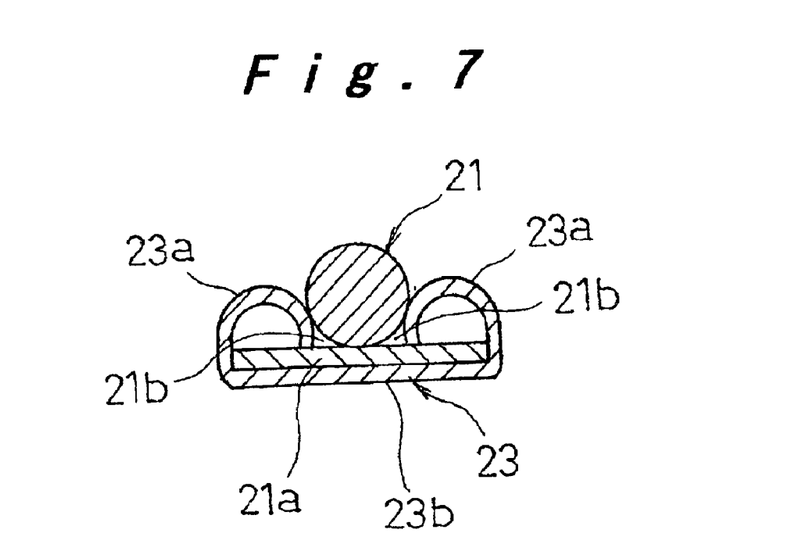
FIG. 7 is a transverse cross-sectional view illustrating a connected state where connection terminals and connection pins for external wiring are connected to each other.

The compressor 14 adapted for the first and second embodiments is arranged such that temperature of the electric motor 3 is detected with a sensor 13 shown in FIG. 8, and drive conditions of the electric motor 3 is controlled depending on the temperature detected. Three pieces of the connection terminals 23 for connection to external wiring for electric-power supply, and two pieces of the connection terminals 23 for connection to external wiring for signals of the sensor 13 are connected to five pieces of the connection pins 21 for external wiring. In the first embodiment, fast-on terminals shown in FIG. 7 are used as the connection terminals 23, and the five connection pins 21 mating with the fast-on terminals are disposed with equal intervals on a circle on a glass-sealed seat portion 4a of the inside-outside connection terminal 4 as shown in FIGS. 3, 4, and 8.

Figure 10:
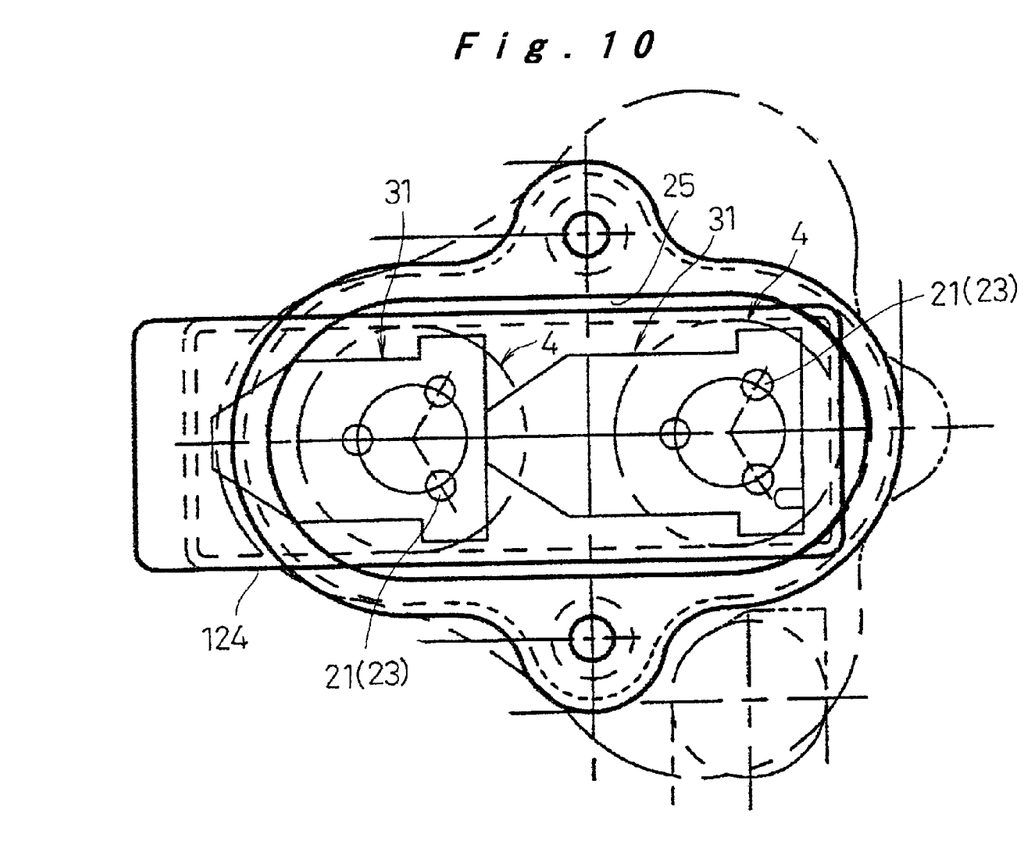
FIG. 10 is a bottom view of the connection portion of FIG. 9.

In the second embodiment, three pieces of the connection terminals 23 are grouped as one cluster block 31, and two of the blocks are used in it. As shown in FIGS. 9 and 10, six pieces of the connection pins 21 for external wiring each of which corresponds to each of the connection terminals 23 of the cluster blocks 31 are distributed by every three pieces to each of the seat portion 4a of two pieces of the inside-outside connection terminals 4. Further, one of the six connection terminals 23 is not connected to the external wiring 5 to be made ineffective along with one of the connection pins 21 corresponding to the connection terminal 23. By doing so, the respective two cluster blocks 31 are interchangeable with each other, and so are the respective two inside-outside connection terminals 4. The inside-outside connection terminal 4 is a type conventionally available, having three pieces of the connection pins 21 for external wiring disposed with equal intervals on a circle, and a cluster block of a type conventionally available can also be used as the cluster block 31.

In the first and second embodiments described above, five or six pieces of the connection terminals 23, of which number of the terminals depends on the embodiment, are collectively treated by the handling of the housing 24 that covers the terminals. Simultaneously, during the handling, the connection terminals 23 are connected to their corresponding five or six connection pins 21 for external wiring through the opening 25 of the housing 24. Further, at the time when the connection is made, the opening 25 of the housing 24 is closed, with the inside-outside connection terminals 4 being put over by the housing 24, as shown in FIGS. 1 and 9, which covers the connection terminals 23 in a waterproof state. By fixing the housing 24 of this state to the case 1 by screws 26 or other means, sealing between the opening 25 and the case 1 is conducted at the same time.

In the first embodiment, the connection terminals 23 are supported within the housing 24 in such a manner that each of them has a small play therebetween. In the second embodiment, the connection terminals 23 in each of the cluster blocks 31 is individually provided with a small play, and the cluster blocks 31 are supported within the housing 24 with a small play provided individually. By doing so, when collectively treating the plurality of connection terminals 23 or both the plurality of connection terminals 23 and the cluster blocks 31 for their connection to the connection pins 21 for external wiring, they are smoothly connected to each other while letting the play absorb displacement that may exist between the respective portions corresponding to each other.

In the first embodiment, as shown in FIGS. 1 to 3, each of the connection terminals 23 is stored and supported within a terminal housing 34 that is individually and integrally formed with a support member 32 through synthetic-resin springs 33. With this arrangement, required play is secured by elastic deformation of the synthetic-resin spring 33 of each of the terminal housings 34. The housing 24 is made of hard material such as metal, ceramic or hard synthetic resin. Preferably, the housing 24, and the support members 32 integrally having the terminal housings 34 are made of PBT containing 15% of graphite. Because these members are made of synthetic resin with an insulation property, special insulation measures are not required for portions where the lead wires 22 are connected to the inside-outside connection terminal 4.

The housing 24 is formed in a round cup shape having a size that covers around an outer periphery of the glass-sealed seat portion 4a located at the inside-outside connection terminal 4, and the support member 32 is arranged along with the seal member 27 within the housing 24. The support member 32 has at its center a support shaft 32a of a tubular shape, and also has the plurality of the synthetic-resin springs 33 unitized with and outwardly extending from the support shaft 32a. Formed integrally at the tip of each of the synthetic-resin springs 33 are the terminal housings 34 of a tubular shape. The synthetic-resin springs 33 are formed in a curved shape as shown in FIG. 3, and the terminal housings 34 can move and displace to any direction around the axis of the support member 32, allowing the connection terminals 23 to play toward different directions.

At the tip side, facing the inside-outside connection terminal 4, of the support member 32, each of tip portions of the support shaft 32a and terminal housings 34 are pressed into coupling holes 27a of the seal member 27 so that the support shaft 32a and the terminal housings 34 are handled as one piece. The seal member 27 is then pressed into the opening 25 for installation, and the rear end portion of each of the terminal housings 34 is set such that it contacts with a back wall of the housing 24.

When connecting the connection terminals 23 stored in each of the terminal housings 34 to the connection pin 21 for external wiring, the terminals 23 are fitted onto the connection pins 21 from the tip sides of the pins. At this time the back wall of the housing 24 receives and holds each of the terminal housings 34 so as not to allow it to backwardly move, preventing play in the direction of the connections from being produced. Each of the connection terminals 23 has at its back portion a coupling piece 23a, cut and lifted from the connection terminal 23, and a groove 34a is formed on a back wall of the terminal housing 34. In the groove 34a, there is a stopper 34b integrally formed with the terminal housing 34, projecting toward the inside of the housing. When the coupling piece 23a is fitted into the groove 34a, each of the connection terminals 23 is prevented from moving sideways, and, in this state, an end portion of the coupling piece 23a contacts with the stopper 34b. This arrangement prevents the connection terminals 23 from backwardly escaping when it is fitted to the connection pins 21 for external wiring.

Further, the housing 24 has at its outermost periphery of the opening 25 an installation flange 24a that is contacted with an outer face of the case 1 and fixed to it with screws. There is a press face 24b at an inner side of the installation flange 24a, and the press face 24b presses the seal member 27 between the flange 24a and the case 1 for conducting sealing between the housing 24 and the case 1. It is arranged such that, with the connection terminals 23 having been connected to the connection pins 21 for external wiring and the opening 25 being in contact with the case 1, the housing 24 is fixed to the case 1 only by the screws 26 and the flanged nuts 127. However, because the housing 24 is made of hard material, the seal member 27 is effectively pinched between the housing 24 and the case 1 only by screwing, so that high sealing effect required for applications for vehicles is secured.

The press face 24b is a downwardly extending slope face, and it conducts sealing when it presses the seal member 27 against an outer periphery 4b of a curbed shape extending at the seat face 4a of the inside-outside connection terminal 4. In this step, as the press face 24b approaches an outer face of the case 1 when the housing 24 is being screwed, the press face 24b also approaches the outer periphery 4b to narrow the distance between them, so that the seal member 27 is compressed to increase sealing pressure. However, the outer periphery 4b tends to outwardly push, with its curbed face, the seal member 27 that downwardly moves along with the press face 24b, and further presses the seal member 27 against the press face 24b. This increases the sealing pressure to enhance sealing effect. Also, a portion, opposing the outer periphery 4b, of the seal member 27 is formed with one or more of seal lips 24c of a circular form projecting toward the outer periphery 4b. With this arrangement, the sealing effect is further increased, because the seal lips 24c are first compressed, and then pressed in the strongest manner against the outer periphery 4b at the time of the compression described above. The seal member 27 is preferably made of highly soft and elastic material such as rubber, and silicon rubber is used in the first embodiment.

The housing 24 additionally has a lead-out port 134, shown in FIGS. 2 and 3, through which the lead wires 22 for external wiring 5 connected to each of the connection terminals 23 are led to the outside. It is arranged such that the lead wires 22 are led to the outside through lead holes 35a in a seal bush 35 made of rubber fitted into the lead-out port 134. Each of the lead holes 35a has a hole diameter corresponding to the size of the lead wire 22, and has on its inner face one or more seal lips 35b projecting toward the inside. The seal lips 35b are compressed by the lead wire 22, so that sufficient seal effect is secured between them.

Sealing of the lead-out port 134 can be conducted at the time when the connection terminals 23 are stored in the housing 24, and a lead wire unit 41 out from which the lead wires 22 are led is formed. Accordingly, this sealing process is not included in sealing work done when connecting the connection terminals 23 to the connection pins 21 for external wiring at the inside-outside connection terminal 4. Further, the seal member 27 can also be attached to the housing 24 beforehand. Accordingly, it is sufficient if a connection device to achieve the connection method described above is provided with the lead wire unit 41, and screws, or the flanged nuts 127 in the first embodiment, as fixing members for fixing the housing 24 of the lead wire unit 41 to the case 1.

Further, in the first embodiment, as shown in FIGS. 1 and 3, installation holes 40 are prepared at a plurality of positions, or more specifically at two positions, asymmetrically arranged on a circle on the installation flange 24a of the housing 24. The housing 24 is fixed to the case 1 by the fitting of the installation holes 40 onto the screws 26 and the flanged nuts 127 engaged on the screws 26. In addition, in the embodiment, a fit assembly 42, an assembly of the support member 32 and the seal member 27, is fitted to the housing 24 always in the same direction. This is done and secured by fitting a positioning projection 43 arranged at an outer periphery of the seal member 27, into a positioning hole 44 arranged at one position on a circle on the installation flange 24a. By the constitution described above, when connecting the housing 24 to the inside-outside connection terminal 4, the housing 24 is made to face in a certain fixed direction to the inside-outside connection terminal 4 that is arranged at the case 1 facing a certain fixed direction. This way the connection terminals 23 for electric-power supply and the connection terminal 23 for signals are connected without any mistake to their corresponding connection pins 21 for external wiring.

Because the housing 24 includes a skirt wall 45 surrounding the seal member 27 from the outside, the skirt wall 45 receives and holds the seal member 27 that tends to outwardly extend when pinched between the housing 24 and the case 1, preventing the seal member 27 from outwardly extending. Thus, the effect of the tight contact between the seal member 27 and the case 1 is increased, and the loosening of the contact with the lapse of time is prevented.

Figure 11:
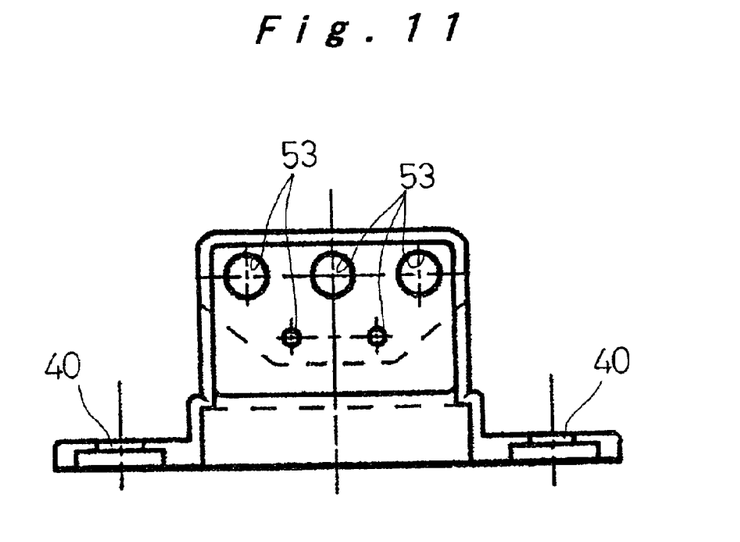
FIG. 11 is a cross-sectional view of a housing at the connection portion of FIG. 9.
Figure 12:
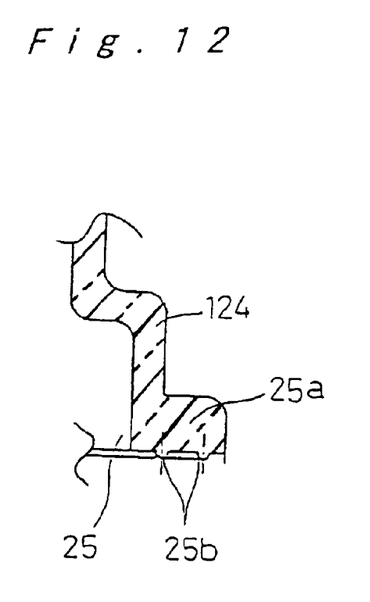
FIG. 12 is an enlarged cross-sectional view of an opening of the housing of FIG. 11.
Figure 13:
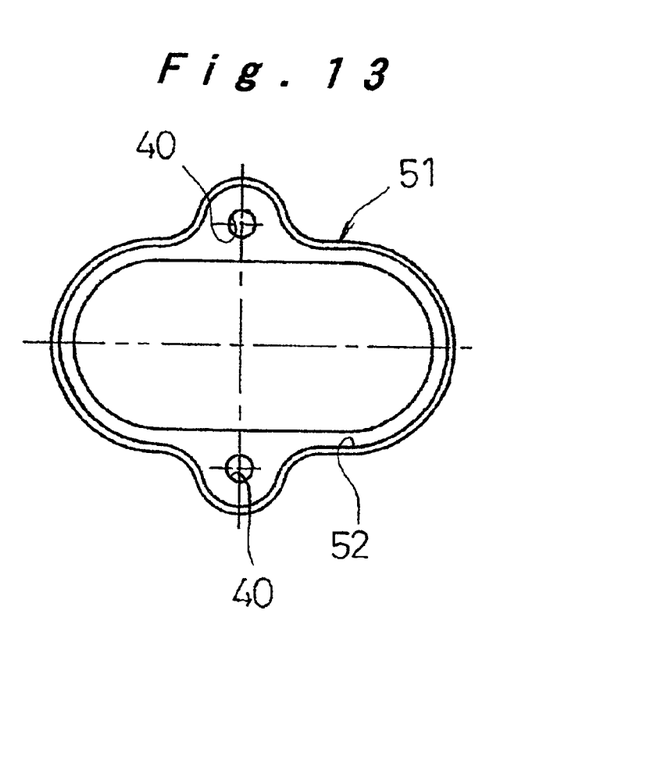
FIG. 13 is a bottom view of a press member at the connection portion of FIG. 9.
Figure 14:
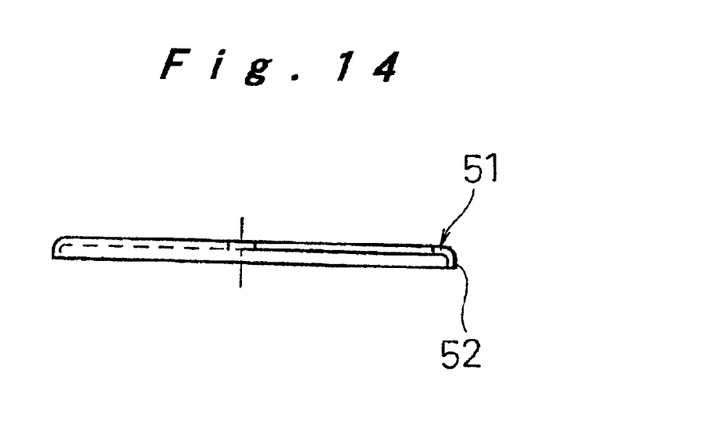
FIG. 14 is a side view of the press member of FIG. 13, with a half of the member being cross-sectioned.

In the second embodiment of FIGS. 9 to 14, a housing 124 shown in FIGS. 9 to 11 is made of soft elastic material such as rubber. Further, as shown in FIG. 9, the opening 25 of the housing 124 is pressed by a press member 51, such as that shown in FIGS. 13 and 14, made of hard material including metal and hard resin, and the housing 124 is fitted to the case 1 by members such as screws 26 and flanged nuts 127. Thereby the sealing between the opening 25 and the case 1 is conducted. The housing 124 of flexible and elastic material has an advantage of excellent adaptability and high contact ability to other materials to be matched with it, and such an advantage enables to secure high seal effect, required for applications to vehicles, between the housing 124 and the case 1 as well as between the housing 124 and the lead wires 22 for the connection to external wiring extending from the connection terminals 23 toward the outside of the housing 124. The press member 51 is a member of a ring shape for pinching a mouth edge 25a, which is a part of the opening 25 and faces outward, between the case 1 and the press member 51. The mouth edge 25a tends to extend outwards when pinched between the press member 51 and the case 1. In such a case, because the press member 51 has a skirt wall 52 surrounding around the outside periphery of the mouth edge 25a, the skirt wall 52 receives and holds the mouth edge 25a to prevent it from escaping outward. Thus, contact effect of the mouth edge 25a against the case 1 is enhanced, preventing the contact from being loosen with time. Further, the face of the mouth edge 25a that contacts with the case 1 is formed with one or more circular seal lips 25b projecting toward the case 1 as shown in FIG. 12, and the seal lips are compressed by being pressed by the press member 51, so that seal effect between the case 1 and the opening 25 is increased.

The housing 124 itself has, as FIGS. 9 and 11 show, lead holes 53 for leading out the lead wires 22, and one or more circular seal lips 53a projecting inward are formed at an inside periphery of each of the through holes 53. In this constitution, without requiring any special seal member, sufficient sealing between the housing 124 and the lead wires 22 is conducted by leading the lead wires 22 through the through holes 53 to the outside. The lead wires 22 support the cluster blocks 31 with appropriate play given by flexibility of portions of the wires extending in the housing 124.

Material preferred for the housing 124 for securing the seal effect is one such as rubber rich in elasticity, and more specifically, silicon rubber. For the press member 51, metal, or more specifically, SPCC is preferred, The housing 24, 124 has transparent portions (such as shown), for example only, in FIG. 12) at least at back portions opposing the opening 25. When a connection is made between the connection terminals and the connection pins for external wiring, their relative positions and work conditions are visible through the transparent portion. This makes the connection process easier.

According to the invention, a plurality of connection terminals are collectively treated by handling a housing covering the terminals, so that the connection terminals are simultaneously connected to their corresponding connection pins for external wiring. Further, through such connection, the housing is closed with an opening of the housing covering an inside-outside connection terminal, and sealing between the opening of the housing and the case is performed. Therefore, connection work including sealing is facilitated, offering excellent workability.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method for connecting a compressor to external wiring, the compressor including a compressing mechanism, an electric motor for driving the compressing mechanism, and a case for accommodating the mechanism and the motor, wherein a plurality of connection pins project from an inside-outside connection terminal arranged on the case, to connect the external wiring through a plurality of connection terminals to supply electric power to the electric motor, the method comprising:

covering the plurality of connection terminals with a housing to collectively protect the plurality of connection terminals held by the housing;

positioning an opening of the housing over the inside-outside terminal;

pressing the opening of the housing, one of directly and with a seal member in between, to the case to form a seal therebetween; and fixing the housing to the case while connecting the plurality of connection terminals to the connection pins for external wiring through the opening of the housing, wherein the housing comprises an elastic material, and is fixed to the case by pressing the opening of the housing against the case with a press member comprising a hard material, the hard material including one of metal and hard resin, and the press member is a ring that pinches an outward facing opening mouth edge of the housing to the case.

2. The method for connecting a compressor to external wiring according to claim 1, wherein the connection terminals are fast-on terminals.

3. The method for connecting a compressor to external wiring according to claim 1, wherein the connection terminals are grouped to form a plurality of cluster blocks, each of the blocks having a predetermined number of the connection terminals.

4. The method for connecting a compressor to external wiring according to claim 1, wherein each of the connection terminals are supported in the housing to have a small amount of play.

5. The method for connecting a compressor to external wiring according to claim 1, wherein the ring has a skirt wall covering an outside periphery of the mouth edge.

6. The method for connecting a compressor to external wiring according to claim 1, wherein the housing has a transparent portion at least at a back portion opposite the opening.

7. A connection device that connects external wiring to a plurality of connection pins, the pins projecting from inside-outside connection terminal arranged at a case of a compressor, the case accommodating a compressing mechanism and an electric motor for driving the compressing mechanism, the connection device comprising:

lead wires;

a plurality of connection terminals arranged at tips of the lead wires to connect to the connection pins;

a housing that covers and collectively protects the plurality of connection terminals, the housing having an opening;

a fixing device that fixes the housing to an outer periphery of the case; and a seal portion that seals the opening to the case, wherein the housing comprises a soft material, the fixing device comprises a hard material including one of metal and hard resin, the fixing device includes a press member that presses an outward facing mouth edge of the opening of the housing to the case, and the seal portion comprises a mouth edge that is compressed between the press member and the case.

8. The connection device according to claim 7, wherein each of the connection terminals is a fast-on terminal that is supported in the housing with a small amount of play.

9. The connection device according to claim 8, wherein a terminal housing that individually receives each of the connection terminals is supported in the housing through an elastic member.

10. The connection device according to claim 7, wherein the connection terminals are grouped to form a plurality of cluster blocks with each block including a predetermined number of the connection terminals, and each of the cluster blocks is supported in the housing with a small amount of play.

11. The connection device according to claim 10, wherein each of the cluster blocks is supported by the lead wire to provide some play through flexibility of the lead wire.

12. The connection device according to claim 7, wherein the press member is a ring.

13. The connection device according to claim 12, wherein the ring has a skirt wall covering an outer periphery of the mouth edge of the housing.

14. The connection device according to claim 7, wherein the housing has a transparent portion at least at a back portion opposite the opening.

15. The connection device according to claim 7 further comprising:

a synthetic-resin spring that supports the connection terminals.

16. The connection device according to claim 7 further comprising:

a lead-out port that provides the lead wires access to the housing.

17. The connection device according to claim 16 wherein the lead-out port further includes a seal.

18. A compressor used that air-conditions a mobile structure, comprising:

a compressing mechanism;

an electric motor that drives the compressing mechanism;

a case that accommodates the mechanism and the motor;

an inside-outside connection terminal arranged at the case, the terminal having a plurality of connection pins for external wiring, the pins projecting from the terminal and being connected to external wiring through which electricity for the compressor is supplied;

a lead wire connector including a housing having an opening, the housing covers and collectively protects a plurality of connection terminals arranged at tips of lead wires that connect to the connection pins; and a fixer that fixes the lead wire connector to an external face of the case, wherein the lead wire connector is provided with a seal that seals the opening of the housing to the case and the housing comprises a soft elastic material, the fixing device includes a press member for pressing a outward facing mouth edge of the opening of the housing to the case, and the seal has a mouth edge compressed between the press member and the case.

19. The compressor according to claim 18, wherein each of the connection terminals is a fast-on terminal and forms a plurality of cluster blocks with each block including a predetermined number of the connection terminals, and one of the individual connection terminals and the cluster blocks are supported in the housing with a small amount of play.

20. The compressor according to claim 18, wherein the press member is a ring.

21. The compressor according to claim 20, wherein the ring has a skirt wall covering an outer periphery of the mouth edge of the housing.

22. The compressor according to claim 18, wherein the housing has a transparent portion at least at a back portion opposite the opening.

23. The compressor according to claim 18 further comprising:

a synthetic-resin spring that supports the connection terminals.

24. The compressor according to claim 18 further comprising:

a lead-out port that provides the lead wires access to the housing.

25. The compressor according to claim 24 wherein the lead-out port further includes a seal.

* * * * *